United States Patent [19]
Vallauri et al.

[11] Patent Number: 5,365,020
[45] Date of Patent: * Nov. 15, 1994

[54] CABLE JOINT COVERINGS, DEVICES FOR APPLYING SUCH COVERINGS AND JOINTS OBTAINED THEREWITH

[75] Inventors: Ubaldo Vallauri, Monza; Bruno Parmigiani, Milan; Francesco Portas, Quattordio, all of Italy

[73] Assignee: Pirelli Cavi S.p.A., Milan, Italy

[*] Notice: The portion of the term of this patent subsequent to Dec. 15, 2009 has been disclaimed.

[21] Appl. No.: 508,783

[22] Filed: Apr. 12, 1990

Related U.S. Application Data

[63] Continuation-in-part of Ser. No. 464,370, Jan. 12, 1990.

[30] Foreign Application Priority Data

Apr. 20, 1989 [IT] Italy ................ 20216 A/89

[51] Int. Cl.⁵ .............. H02G 15/08; H02G 15/18
[52] U.S. Cl. .................. 174/73.1; 174/84 R; 174/93; 174/DIG. 8
[58] Field of Search ........ 174/73.1, 93, 88 C, 174/84 R, DIG. 8; 29/235, 450

[56] References Cited

U.S. PATENT DOCUMENTS

| | | | |
|---|---|---|---|
| 3,515,798 | 6/1970 | Sievert | 174/135 |
| 3,990,479 | 11/1976 | Stine et al. | 138/125 |
| 3,992,567 | 11/1976 | Malia | 174/73.1 |
| 4,029,895 | 6/1977 | Scarborough | |
| 4,035,534 | 7/1977 | Nyberg | |
| 4,079,189 | 3/1978 | Troccoli | 174/73.1 |
| 4,238,639 | 12/1980 | Palmieri | 174/73.1 |
| 4,304,616 | 12/1981 | Richardson | 174/73.1 |
| 4,314,093 | 2/1982 | Eldridge et al. | 174/73.1 |
| 4,363,842 | 12/1982 | Nelson | 174/73.1 X |
| 4,383,131 | 5/1983 | Clabburn | 174/73.1 |
| 4,389,440 | 6/1983 | Keith | 428/36 |
| 4,431,469 | 2/1984 | Famcomato | |
| 4,487,994 | 12/1984 | Bahder | 174/73.1 |
| 4,503,105 | 3/1985 | Tomioha | 428/36 |
| 4,613,533 | 9/1986 | Loomis et al. | 428/36 |
| 4,868,967 | 9/1989 | Holt et al. | 174/135 X |

FOREIGN PATENT DOCUMENTS

| | | |
|---|---|---|
| 560363 | 2/1982 | Australia . |
| 47939 | 7/1990 | Australia . |
| 117092 | 8/1984 | European Pat. Off. . |
| 0149032 | 7/1985 | European Pat. Off. . |
| 291203 | 11/1988 | European Pat. Off. . |
| 3001158 | 7/1980 | Germany . |
| 0049588 | 4/1979 | Japan . |
| 0294209 | 11/1988 | Japan .............. 174/84 R |
| 1294665 | 11/1972 | United Kingdom . |
| 1337951 | 11/1973 | United Kingdom . |
| 2183935 | 6/1987 | United Kingdom ...... 174/73.1 |

*Primary Examiner*—Leo P. Picard
*Assistant Examiner*—Hyung S. Sough
*Attorney, Agent, or Firm*—Brooks Haidt Haffner & Delahunty

[57] ABSTRACT

A covering for a joint between electric cables, an element including such covering for forming a covered joint and a joint obtained with such covering. The covering includes two radially elastic sleeves of cross-linked polymeric material, one sleeve being inside and co-axial with the other sleeve. In the unassembled state, the diameter of the bore of the outer sleeve is less than the diameter of the outer surface of the inner sleeve so that when assembled, the outer sleeve exerts radially inward pressure on the inner sleeve. Each sleeve may be formed of one or more tubular layers of polymeric material.

54 Claims, 3 Drawing Sheets

5,365,020

CABLE JOINT COVERINGS, DEVICES FOR APPLYING SUCH COVERINGS AND JOINTS OBTAINED THEREWITH

This application is a continuation-in-part of application Ser. No. 464,370, filed Jan. 12, 1990 and entitled Multi-Layer Elastic Sleeves for Electric Power Cable Joints and Joints Therewith.

The present invention relates to a covering or sleeve for cable joints, and in particular, to a covering for surrounding the mechanical and electrical connection of the conductors of two cables and which is fitted and elastically tightened on the end portions of the cables.

The invention also relates to an element of a device for providing cable joints comprising the covering described, and to the cable joints obtained by means of said covering.

Different types of elastically expansible and collapsible coverings made up of cross-linked polymeric material compounds for forming cable joints are known in the art. The known coverings differ from one another in the number and type of the component tubular layers which, however, are always coaxial and superimposed one upon the other.

For example, a covering for cable joints constituted by a single tubular layer of an electrically insulating cross-linked polymeric material is known.

Another known covering for cable joints is formed by two coaxial and superimposed tubular layers of which the radially innermost one is made up of a cross-linked polymeric material having a dielectric constant $\epsilon$ not lower than 6 and is commonly called an electric field distributing layer, while the radially outermost tubular layer is made up of an electrically insulating cross-linked polymeric material compound.

A further known covering for cable joints is formed by three coaxial and superimposed tubular layers of cross-linked polymeric material compounds. In particular, the radially innermost layer is made up of a compound having a dielectric constant $\epsilon$ not lower than 6, the intermediate layer is made up of an electrically insulating compound and the radially outermost layer is made up of a semi-conductive compound.

In all the known coverings for cable joints briefly described hereinbefore, the inner cavity of any whatsoever tubular component layer (preferably separated from the others) has exactly the same diameter as the outer diameter of the tubular layer radially inwardly thereof whether or not said layers are independent of one another or are mutually linked along the surfaces of mutual contact.

Moreover, all the above-described known coverings are, at present, stored with no mechanical stress applied thereto while awaiting the fitting thereof on a device for forming joints and/or in a joint. This is because the coverings of polymeric material, even if cross-linked, are subject to the risk of suffering permanent deformations when they are subjected to mechanical stresses for a length of time.

In fact, although the known coverings, once applied on a joint, are subject to mechanical stress applied for an indefinite period of time (since they have to tighten elastically on the cable ends connected to each other at the joints), the determination of their size is carried out in such a way as to avoid that the mechanical stresses applied thereto during the whole life of a joint are of such a magnitude as to produce with time inadmissible permanent deformations.

For this reason, to effectuate joints in the wide range of the existing cables of different diameters, a plurality of coverings of different diametrical dimensions and thickness (one for each diameter of existing cable) are provided, and it is not possible with a known covering to effectuate joints in cables of different diametrical dimensions even if there are only small differences in such dimensions.

This obliges the manufacturers and users to store a very large number of coverings for joints of different diameters in order to cover all the possible needs.

To apply a covering on a joint, there are used known devices, and examples of these latter are described in the European Patent No. 149 032 of the assignee of this application, German Patent No. 3 011 158 and Japanese Patent No. 54-49588.

The known devices comprise an element in the form of a tubular support on which the covering is fitted in a radially elastically expanded condition, and the bore or cavity of said tubular support has a diameter of dimensions greater than the outer dimensions of the cables between which the joint is to be effected. Moreover, said known devices comprise means for removing the tubular support from the covering in order to permit this latter to contract elastically and surround the zone of mechanical and electrical connection of the conductors and to tighten elastically on the end portions facing each other, of the cable lengths between which the joint is effected.

The covering or sleeve, to be fitted on the tubular support, is subject to a radial elastic expansion, and said radial elastic expansion produces, in the covering, the application of not insignificant mechanical stresses since the cavity or bore of the tubular support has diametrical dimensions greater than the outer dimensions of the cables between which the joint is to be made. With the known coverings, it is impossible to store elements of the known devices for effecting joints with the coverings for joints fitted in elastically expanded condition on the supports.

This is because the stresses existing in said coverings, which are much higher than those existing in the coverings when applied on a joint (owing to the considerably greater radial expansion to which they are subjected) would produce permanent deformations the existence of which can make the coverings themselves unusable.

In fact, an essential factor for a joint is that the coverings can always exert on the facing end portions of the cables an elastic tightening of such a magnitude as to ensure an absence of traces of air between the surfaces of the covering in contact with the cable surfaces and also to ensure minimum water penetration or concentration at said contacting surfaces.

The above involves also the need of using a specific tubular support for any specific diameter of existing cables between which joints are to be effected in order to reduce to the minimum the stresses to be applied to the covering. Thus, with prior art coverings and supports, there is the need of storing, in addition to a plurality of coverings different from one another in their diametrical dimensions, a plurality of tubular supports of different diametrical dimensions in order to realize joints in the wide range of the existing cables having different diameters and to fit a covering on the relative tubular support only when the joint is made.

To fit the coverings on the tubular supports only when the joint is made, means that the fitting operation must be effected in place with the risk that any operation carried out "on site" causes an increase of the execution time for forming the joints.

From the foregoing, it is apparent that with the known techniques, it is impossible firstly, to have a covering able to make joints in cables having different diameters and secondly, to store said covering already applied on a tubular support that permits the realization of joints between cables having different diameters.

In order to overcome the above-described problems, it has been proposed in our co-pending application Ser. No. 464,370 filed Jan. 12, 1990, the specification of which is incorporated herein by reference, to provide a covering for the mechanical and electrical connection between the conductors of two cables which comprises at least two coaxial and superimposed tubular sleeves of polymeric material compounds, preferably, but not necessarily, co-extruded and cross-linked together, the radially outermost sleeve of which is made of a compound having a residual deformation due to an elongation imposed and applied for a time smaller than that of the compound or compounds constituting the radially innermost sleeve, this latter sleeve being electrically insulating at least for a part of its thickness.

In particular, in the covering forming the subject of said patent application, the cavity or bore of the radially outermost sleeve has the diameter exactly equal to the outer diameter of the radially innermost sleeve, when separated from each other.

By means of a single covering for joints having the above-described characteristics, it is possible to make joints between cables selected from a wide range of diameters and wherein the ratio between the maximum diameter and the minimum diameter of said range of cables is as high as 1.6 and to store for a period of time up to two years the coverings applied on a tubular support without running into any drawbacks.

With the solution according to said patent application, it is not possible to effectuate with a single covering, stored in radially elastically expanded condition on a tubular support for a period of time up to two years, joints between a series of cables wherein the ratio between the maximum diameter and the minimum diameter exceeds the value of 1.6 because unacceptable permanent deformations occur in the coverings.

An object of the present invention is that of providing a covering for joints which will allow, with only one type of covering, the forming of joints between cables having, a wider range of diameters, in particular, between cables in which the ratio between the maximum diameter and the minimum diameter is as high as 2 and which can be stored for a period of time up to two years, said coverings being applied on tubular supports suitable for realizing joints in the indicated wider range of diameters of cables and being stored as elements of the devices for realizing joints for the cables in question.

With the invention, during the removal of the tubular support from the covering, the elastic contraction of covering on the mutually connected cable end portions takes place in a time shorter than that required with the solution proposed in said patent application Ser. No. 464,370, thereby producing more reliable joints.

Another object of the present invention is an element of a device for realizing cable joints and a cable joint comprising the covering of the invention.

The covering of the present invention for cable joints comprises at least a first and a second sleeve, both sleeves being elastically expansible in the radial direction, coaxial, superimposed, independent of each other and formed by cross-linked polymeric material compounds. The first sleeve, which is radially inside the second sleeve, is made, at least for a part of its radial thickness of an electrically insulating, cross-linked polymeric material compound, and the second sleeve, when separated from the first sleeve and in the absence of any mechanical stress applied thereto, has a cavity or bore diameter smaller than the outer diameter of the first sleeve when the latter is separated from the second sleeve and there is mechanical stress applied thereto.

The element of a device of the present invention for realizing a joint between electric cables comprises a covering for electric cable joints fitted on a rigid tubular support in an elastically expanded condition, said covering comprising a first sleeve and a second sleeve, both sleeves being elastically expansible in the radial direction, coaxial, superimposed, independent of each other and formed by cross-linked polymeric material compounds. The first sleeve, radially inside the second sleeve, is, at least for a part of its thickness, made of an electrically insulating, cross-linked polymeric material compound. The element is characterized by the fact that the second sleeve, when taken by itself and separately from the first sleeve and from the tubular support and in absence of any applied mechanical stress, has a cavity or bore diameter smaller than the outer diameter of the first sleeve, when taken by itself and separately from both the second sleeve and the tubular support.

An electric cable joint of the present invention comprises an electrical and mechanical connection between the conductors of the two cables and a covering for said connection comprising at least a first and a second sleeve, both sleeves being elastically expansible in radial direction, coaxial, superimposed, independent of each other and formed by cross-linked polymeric material compounds. The first sleeve, radially inside the second sleeve, is constituted, at least for a part of its thickness, by an electrically insulating, cross-linked polymeric material compound.

The joint is characterized by the fact that the second sleeve, when separated from the first sleeve and from the cables and in absence of any applied mechanical stress, has a cavity or bore diameter smaller than the outer diameter of the first sleeve when it is separated from the second sleeve and from the cables and without any mechanical stress applied thereto.

Other objects and advantages of the present invention will be apparent from the following detailed description of the presently preferred embodiments thereof, which description should be considered in conjunction with the accompanying drawings in which:

FIG. 1 shows in perspective view a covering or sleeve, according to the invention, for cable joints which it is possible to use for joints for a series of cables in the ratio between the maximum diameter and the minimum diameter of which can be as high as 2, for example, for a series of cables having outer diameters in the range from 20 to 40 mm.

Figure 1:
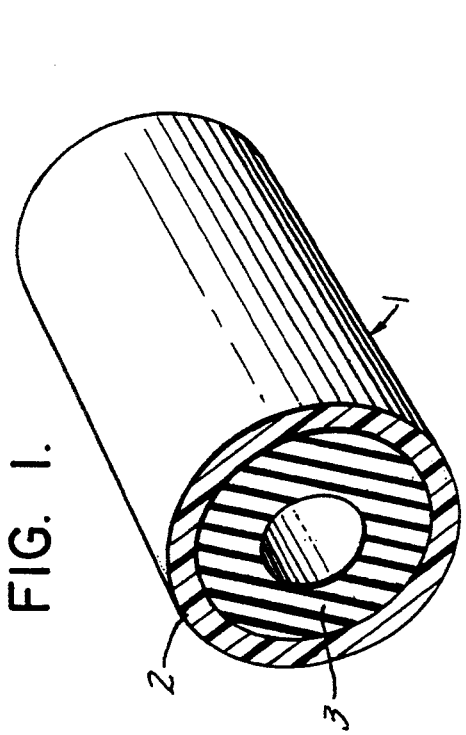
FIG. 1 is a perspective view of a covering for cable joints, according to the invention.

As shown in FIG. 1, the covering 1 comprises an outer second sleeve 2 and an inner first coaxial sleeve 3 which is radially inside the second sleeve 2 and which is not bonded or linked to the sleeve 2 at the mutually contacting surfaces.

Figure 2A:
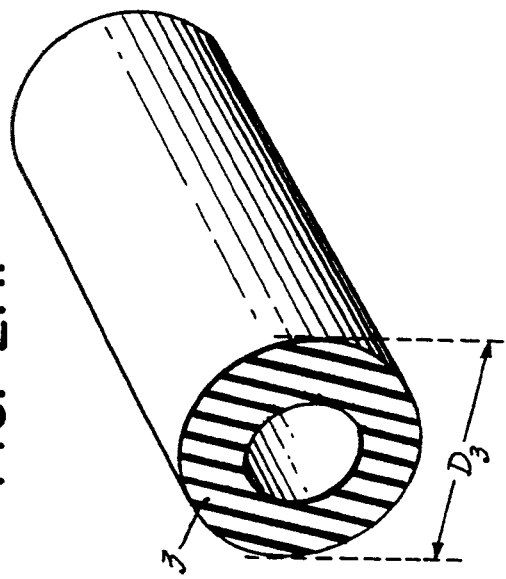
FIGS. 2A and 2B are perspective views of the components of the covering shown in FIG. 1.
Figure 2B:
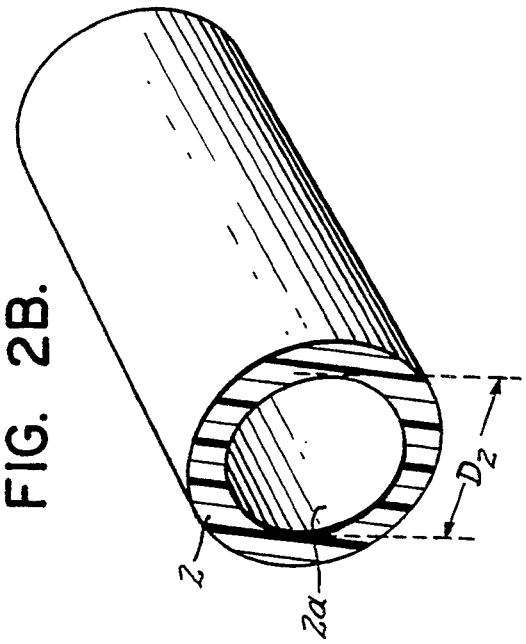

An essential factor, for the purposes of the present invention, is that the second sleeve 2 taken by itself, i.e. separately from the first sleeve 3 and in the absence of any applied mechanical stress (as shown in FIG. 2B), has a diameter $D_2$ for its tubular cavity or bore $2a$ smaller than the outer diameter $D_3$ of the first sleeve 3 taken by itself, i.e. separately from the tubular body 2 and in the absence of any applied mechanical stress (shown in FIG. 2A). Preferably, the ratio between the diameters $D_3$ and $D_2$ is not less than 1.2. For example, in a series of cables having diameters between 20 and 40 mm, the ratio between diameter $D_3$ and $D_2$ is, for example, 2.8.

Both of the sleeves 2 and 3 are made of cross-linked polymeric material compounds. Generally, the first sleeve 3 is formed, at least for a part of its own thickness, by a compound of an electrically insulating, cross-linked polymeric material. Always, in general, the second sleeve 2 has a residual deformation smaller than 35% for an imposed elongation of 50%, determined according to standard UNI 7321-74 on a flat test piece at 100° C. for a period of time of 500 hours.

In particular, preferably the second sleeve 2 is formed, at least for the radially outermost part of its thickness, by a polymeric material cross-linked compound which has a residual deformation, due to an imposed elongation applied for a period of time, smaller than that of at least one of the cross-linked compounds forming the first sleeve 3.

From the foregoing, it is apparent that in the covering of FIG. 1 the second sleeve 2 is radially elastically expanded by the first sleeve 3 and exerts a radial pressure on the sleeve 3.

The pressure exerted by the second sleeve 2 on the first sleeve 3 depends, firstly, but not exclusively, on the difference between the previously indicated diameters $D_2$ and $D_3$, i.e. when the sleeves are by themselves and are without any mechanical stress thereon as shown in FIGS. 2A and 2B.

Other factors contributing to the pressure which the second sleeve 2, fitted on the first sleeve 3, exerts on the sleeve 3 are the modulus E and the thickness, measured in radial direction, of the layer or layers forming the second sleeve 2.

In particular, the modulus E of the cross-linked compounds constituting the second sleeve 2 is not lower than 0.2 MPa, while the modulus E of the compound constituting the first sleeve 3 is between 0.2 and 20 MPa.

Moreover, in a covering according to the invention, the percentage ultimate tensile elongation of the compounds forming the second sleeve 2 is preferably not lower than 300% and the percentage ultimate tensile elongation of the compounds forming the first sleeve 3 is preferably not lower than 150% in order to avoid tearing of said sleeves during their elastic expansion.

FIGS. 4 to 7 illustrate, in section, different embodiments of a covering for cable joints according to the invention.

Figure 4:
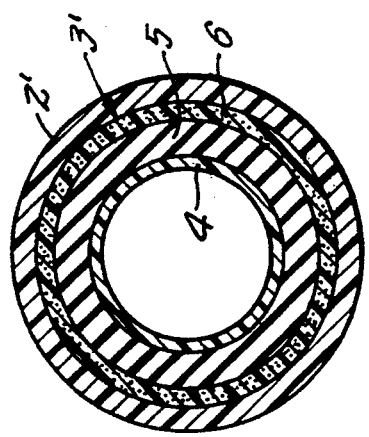

In the embodiment shown in FIG. 4, the second sleeve 2' is a single tubular layer completely formed by cross-linked polymeric material compounds for which no electric or dielectric characteristic is required. However, the mechanical characteristics of the sleeve 2' are selected so that it has a residual deformation smaller than 35% for an imposed elongation of 50%, determined according to the standard UNI 7321-74 on a flat test piece at 100° C. for a period of time of 500 hours, a thickness and a modulus E, respectively, not less than 1 mm and 0.2 MPa, and a percentage ultimate elongation not less than 300%.

In the FIG. 4 embodiment and in all the embodiments described hereinafter, unless otherwise indicated, the thicknesses of the sleeves and/or of their component layers are values measured on the sleeves taken by themselves and in the absence of applied stresses.

For example, the second sleeve 2' can have a thickness of 6 mm and can be constituted by a cross-linked polymeric material compound with modulus E of 1.5 MPa and having a residual deformation of 25% for an imposed elongation of 50% applied for a period of time of 500 hours and at a temperature of 100° C.

Moreover, the percentage ultimate elongation of the compound forming the second sleeve 2' is 500%.

An example of compound suitable for the second sleeve 2' is that having the following composition in parts by weight:

| | |
|---|---|
| Ethylene-propylene-diene terpolymer, for example, that sold in the market under the name DUTRAL TER=048 by DUTRAL S.p.A. | 100 |
| poly 1.2 dihydro 2.2.4 trimethyl-quinoline | 1.6 |
| mercaptobenzymidazol | 2 |
| kaolin, for example that sold in the market under the name ARGIREC G.24 by Silice & Caolin in France | 100 |
| trimetoxyetoxyvinylxylane | 2.5 |
| paraffinic plasticizer | 50 |
| stearic acid | 1 |
| triallyl cyanurate | 1.5 |
| carbon black, for example that sold in the market under the name VULCAN P | 2.5 |
| dicumyl peroxide | 3 |

The characteristics of the described compound, after cross-linking, are the following:

| | |
|---|---|
| ultimate tensile strength | 6 MPa |
| percentage ultimate tensile elongation | 650% |
| modulus E | 1.5 MPa |
| residual deformation due to an imposed elongation of 50%, determined according to the standard UNI 7321-74, on a flat test piece at 100° C. and for a period of time of 500 hours | 25% |

The inner sleeve 3' is a composite sleeve and is constituted, from the inside outwards, by three tubular layers 4, 5 and 6, said layers being coaxial with one another, superimposed, coextruded and cross-linked together.

The radially innermost tubular layer 4, for example, having a thickness of 3 mm, is constituted by a compound of a polymeric material the characteristic of which is that of having a dielectric constant ε not lower than 6 to allow said tubular layer to carry out the function of electric field distribution when applied to a joint.

One example of compound suitable for the tubular layer 4 has the following composition in parts by weight:

| | |
|---|---|
| ethylene-propylene copolymer, for example, that sold in the market under the name DUTRAL CO-054 by Dutral S.p.A. | 100 |
| zinc oxide | 5 |
| carbon black, for example, that sold in the market under the name HUBER N 990 by DEGUSSA S.p.A. | 140 |
| paraffinic plasticizer | 40 |
| poly 1.2 dihydro 2.2.4 trimethyl-quinoline | 1.5 |
| stearic acid | 1 |
| triallyl cyanurate | 1 |
| dicumylperoxide | 2 |

The characteristics of the compound described immediately hereinbefore, after cross-linking, are as follows:

| | |
|---|---|
| ultimate tensile strength | 7 MPa |
| percentage ultimate tensile elongation | 560% |
| modulus E | 1.5 MPa |
| residual deformation due to an imposed elongation of 50% determined according to the standard UNI 7321-74 on a flat test piece at 100° C. after a period of time of 500 hours | 28% |
| dielectric constant ε determined according to standard ASTM D150 | 15 |
| volume resistivity determined according to the standard ASTM D257 | $10^{10}$ ohm × cm |

The intermediate tubular layer 5, for example, having a thickness of 8 mm, is constituted by a polymeric material compound which is electrically insulating.

One example of compound suitable for the tubular layer 5 has the following composition in parts by weight:

| | |
|---|---|
| ethylene-propylene copolymer, for example that sold in the market under the name DUTRAL CO-054 by Dutral S.p.A. | 100 |
| zinc oxide | 5 |
| stearic acid | 1 |
| lead oxide (Pb₃O₄) | 5 |
| calcined kaolin treated superficially with trimetoxyetoxyvinylxylane | 70 |
| trimetoxyetoxyvinylxylane | 1 |
| triallyl cyanurate | 1.5 |
| paraffinic plasticizer | 18 |
| poly 1.2 dihydro 2.2.4 trimethyl-quinoline | 1.5 |
| mercaptobenzo imidazol | 2 |
| α, α' bis (ter-butylperoxy) m p diisopropylbenzene | 1.7 |

The characteristics of the compound for layer 5, after cross-linking, are as follows:

| | |
|---|---|
| ultimate tensile strength | 7 MPa |
| percentage ultimate tensile elongation | 560% |
| modulus E | 1.5 MPa |
| residual deformation due to an imposed elongation of 50% determined according to the standard UNI 7321-74 on a flat test piece at 100° C. and for a period of time of 500 hours | 28% |
| dielectric constant ε, determined according to the standard ASTM D150 | 2.8 |
| volume resistivity, determined according to the standard ASTM D257 | $10^{15}$ ohm × cm |

The radially outermost tubular layer 6, for example, having a thickness of 4 mm, of the second tubular body 3' is constituted by a compound of cross-linked polymeric material which is semi-conductive.

One example of compound suitable for the tubular layer 6 has the following composition in parts by weight:

| | |
|---|---|
| ethylene-propylene-diene terpolymer, for example, that sold in the market under the name DUTRAL TER - 046E3 by Dutral S.p.A. | 100 |
| conductive carbon black, for example, that sold in the market under the name VULCAN P by Cabot S.p.A. | 39 |
| superconductive carbon black, for example, that sold in the market under the name KETIEN EC by Akzo S.p.A. | 13 |
| zinc oxide | 5 |
| poly 1.2 dihydro 2.2.4 trimethyl-quinoline | 1.5 |
| paraffinic plasticizer | 18.6 |
| paraffin | 4 |
| stearic acid | 1 |
| triallyl cyanurate | 1 |
| dicumylperoxide | 5 |

The physical characteristics of the compound for the layer 6 are as follows:

| | |
|---|---|
| ultimate tensile strength | 17.8 MPa |
| percentage ultimate tensile elongation | 230% |
| modulus E | 5 MPa |
| residual deformation due to an imposed elongation of 50% determined according to the standard UNI 7321-74 on a flat test piece at 100° C. for a period of time of 500 hours | 13% |
| volume resistivity determined according to the standard ASTM D257 | 100 ohm × cm |

In the particular embodiment of a covering according to the invention shown in FIG. 4, wherein the two sleeves have the same length, the ratio between the outer diameter of the first sleeve 3', taken by itself and in the absence of any applied mechanical stress, and the inner diameter of the second sleeve 2' taken by itself and in the absence of any applied mechanical stress, is, for example, 2.8.

In the embodiment described in connection with FIG. 4, the sleeve 2' is axially continuous, but in an alternative embodiment, the second sleeve 2' is not axially continuous, but is axially discontinuous being formed by a plurality of rings placed side-by-side.

Figure 5:
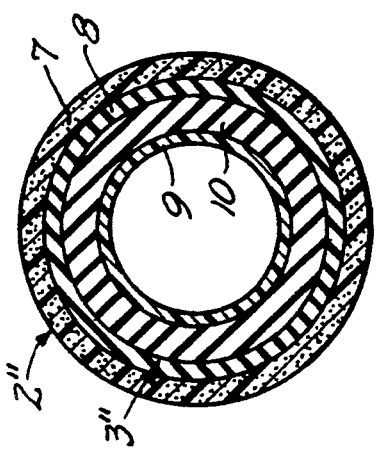

FIG. 5 shows in cross-section another embodiment of a covering for cable joints according to the invention.

As shown in FIG. 5, both the first and the second sleeve are formed by two coaxial, superimposed layers, the layers of a sleeve being coextruded and cross-linked together.

In particular, the second sleeve 2'' comprises an outer layer 7 made of the same semi-conductive compound as that forming the layer 6 of the embodiment of FIG. 4 and an inner layer 8 made of an insulating compound, for example, the same as that forming the tubular layer 5 of the embodiment of FIG. 4.

The composite first sleeve 3″ comprises an electric field distributing inner layer 9 made of the same compound as that forming the tubular layer 4 of the embodiment of FIG. 4 and an outer layer 10 made of an electrically insulating material compound, for example, that forming the tubular layer 5 of FIG. 4.

Moreover, in the embodiment of FIG. 5, the ratio between the outer diameter of the first sleeve 3″, taken by itself and in the absence of any applied mechanical stress, and the inner diameter of the second sleeve 2″, taken by itself and in the absence of any applied mechanical stress is, for example, equal to 2.

Moreover, the layers 9, 10, 8 and 7 have thicknesses and characteristics corresponding, respectively, to those of the layers 4, 5, 6 and 2′ of the embodiment of FIG. 4.

Figure 6:
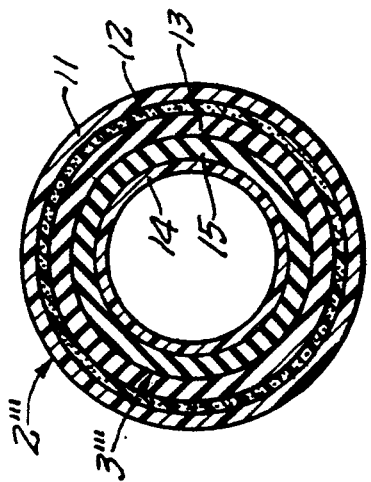
FIGS. 4-7 illustrate, in cross-section, further embodiments of coverings according to the invention.

A further alternative embodiment of a covering for joints according to the invention is shown in cross-section in FIG. 6.

As shown in FIG. 6, the composite second sleeve 2‴ is formed by three tubular layers 11, 12 and 13, said tubular layers being coaxial with one another, superimposed and coextruded and cross-linked together (which will be described hereinafter) and the first sleeve 3‴ (having the same length as that of the second sleeve 2‴) is formed by two tubular layers 14 and 15, coaxial, superimposed, coextruded and cross-linked together, and are also described hereinafter.

The ratio between the outer diameter of the first sleeve 3‴, taken by itself and in the absence of any applied mechanical stress, and the inner diameter of the second sleeve 2‴, taken by itself and in the absence of any applied mechanical stress is, for example, 1.8.

Of the three layers constituting the second sleeve 2‴, the radially innermost one 13 has a thickness of 5 mm and is constituted by a cross-linked polymeric material compound having electrically insulating characteristics. An example of a compound for the tubular layer 13 is that indicated for the insulating layer 5 of the embodiment of FIG. 4.

The intermediate tubular layer 12 has a thickness of 3 mm and is constituted by a cross-linked polymeric material compound having semi-conductive properties. One example of compound for the tubular layer 12 is that indicated for the semi-conductive layer 6 of the embodiment of FIG. 4.

The radially outermost tubular layer 11 has a thickness of 4 mm and is constituted by a cross-linked polymeric material compound for which no dielectric or electric characteristic and only mechanical characteristics are required, and one example for said compound is that, described for the layer 2′ of the embodiment of FIG. 4.

In the composite first sleeve 3‴, formed by two layers, the radially innermost one 14, has a thickness of 3 mm and is constituted by a cross-linked polymeric material compound having a dielectric constant ε of 15. The compound forming said layer 14 is the same as that previously indicated for the layer 4 of the embodiment of FIG. 4.

The radially outermost layer 15 of the first sleeve 3 has a thickness of 5 mm and is constituted by a cross-linked polymeric material compound having electric insulating characteristics, and the compound forming the same is, for example, that previously described for the layer 5 of the embodiment of FIG. 4.

Figure 7:
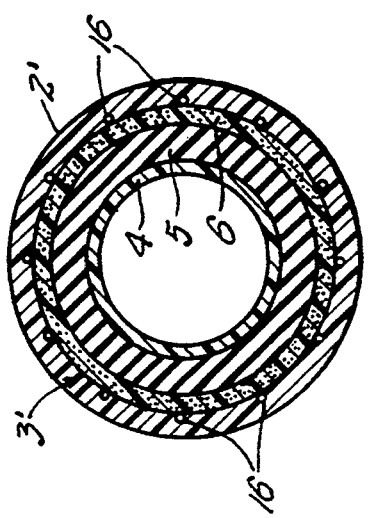

A further alternative embodiment of a covering for cable joints according to the invention is illustrated in FIG. 7.

The alternative embodiment shown in FIG. 7 differs from that of FIG. 4 only in that between the first sleeve 3′ and the second sleeve 2′, there is interposed an electrically conductive element at least partially discontinuous in the circumferential direction, and in particular, a plurality of electrically conductive elements 16 circumferentially separated from one another and projecting from both the ends of the covering itself. Examples of electrically conductive elements 16 are copper wires, strips of braided copper wires, a braiding of copper wires and the like.

In the embodiments of coverings according to the invention illustrated in FIGS. 4–7, the first and second sleeves can have the same axial length, but if desired, the outer second sleeve can have an axial length greater than that of the inner first sleeve so that end portions of the second sleeve project beyond the ends of the first sleeve. Specifically, the end portions of the outer second sleeve projecting from the first sleeve can have a length not less than 10% of the first sleeve length.

Preferably, the end portions of the second sleeve projecting from the ends of the first sleeve are turned back onto the second sleeve before the covering is applied in a cable joint.

Figure 8:
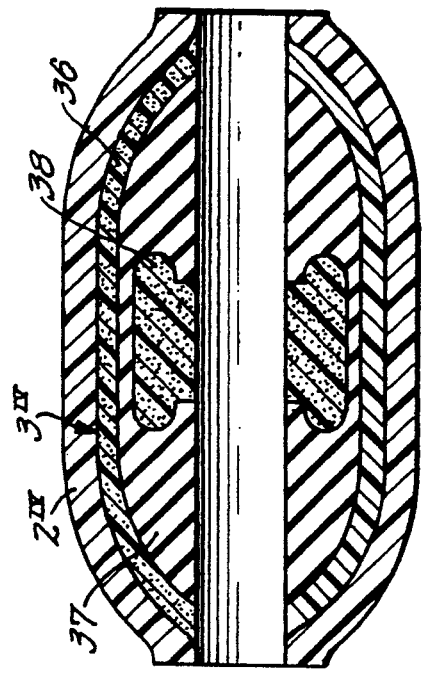
FIG. 8 is a longitudinal section of a further embodiment of a covering according to the invention.

A further embodiment of a covering according to the invention is illustrated in longitudinal section in FIG. 8.

As shown in FIG. 8, the covering comprises a second sleeve $2^{IV}$ and a first sleeve $3^{IV}$ having tapered ends.

The second sleeve $2^{IV}$ is formed by a single tubular layer having the same characteristics as the tubular layer 2′ of FIG. 4.

The first sleeve $3^{IV}$ is formed by a radially outermost semi-conductive layer 36, for example, constituted by the same compound as that forming the layer 6 of FIG. 4, and by an inner layer 37 of insulating material, for example, constituted by the same compound as that forming the layer 5 of FIG. 4.

A body 38 constituted by a semi-conductive material compound, for example, the same as that forming the layer 36, is embedded in the layer 37 and faces the cavity or bore of the covering.

As pointed out hereinbefore, one object of the present invention also is an element for use with a device for effectuating cable joints. The element comprises a rigid tubular support, mechanically resistant in radial direction, on which a covering for cable joints according to the invention is fitted in radially elastically expanded condition.

Figure 3:
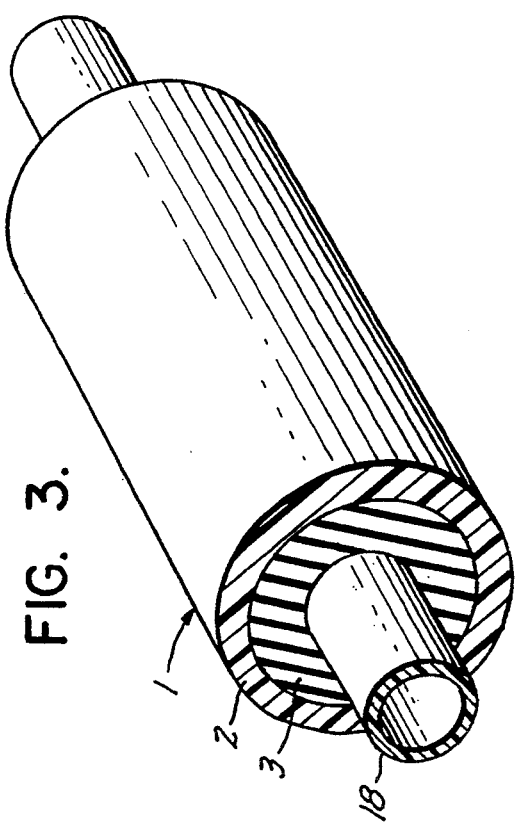
FIG. 3 is a perspective view of the covering shown in FIG. 1 mounted on a tubular support.

FIG. 3 shows in perspective view an element, according to the invention, for use with a device for realizing cable joints.

As shown in FIG. 3, the element comprises a tubular support, for example, a length of a rigid tube 18 of polymeric material, for example, polyvinyl chloride.

The rigid tube 18 can, for example, have a thickness of 2.5 mm and a cavity or bore of 45 mm. Such bore dimension makes it possible to cover joints of cables having a diameter in the range from 20 to 40 mm.

The covering 1, according to the invention and shown in FIGS. 1, 2A and 2B and previously described with reference to said figures, is fitted on the length of the rigid tube 18.

Figure 9:
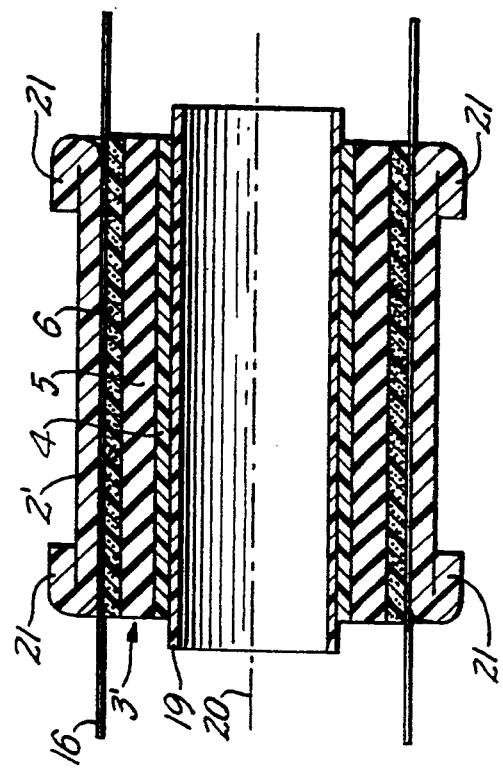
FIG. 9 is a longitudinal section of an alternative embodiment according to the invention of a device for effectuating cable joints.

FIG. 9 illustrates an alternative embodiment, according to the invention, of an element for use with a device for realizing cable joints.

As shown in FIG. 9, the element comprises a length of the rigid tube 19 on which a covering according to the invention is fitted. The cross-section of the covering taken perpendicular to the longitudinal axis 20 of the element is that of the embodiment shown in FIG. 7, and therefore, comprises a second sleeve 2' formed by a single tubular layer and a first sleeve 3' formed by three coaxial and superimposed tubular layers 4, 5 and 6 having characteristics previously described.

As shown in FIG. 9, the second sleeve 2' has end portions 21 thereof turned back on its own outer surface, and the length of said turned back portions 21 preferably is equal to 40% of the length of the first sleeve 3'.

The solution shown in FIG. 9 is particularly advantageous since the covering also comprises an element for the outer protection of the joint In fact, the second sleeve 2', being longer than the first sleeve 3', extends beyond the ends of the sleeve 3' a distance sufficient to embrace the outer sheaths of the cables being joined, thereby providing in said zone the tightness required to prevent the entrance of outside agents.

Moreover, a plurality of copper wires 16, or the like conductive material, is interposed between the two sleeves 2' and 3' so that said wires project from both ends of the covering. The wires 16 can, for example, but not necessarily, extend parallel to the generatarices of the sleeves themselves.

An element according to the invention of a device for realizing cable joints can be those wherein a covering for cable joints according to the invention is fitted in elastically expanded condition on a tubular support, the only requisite being that the covering can be maintained thereon in radially elastically expanded condition for a period of two years without the covering suffering damage.

The present invention also includes joints between cables comprising coverings according to the invention and realized with the elements of devices for effectuating cable joints according to the invention.

Figure 10:
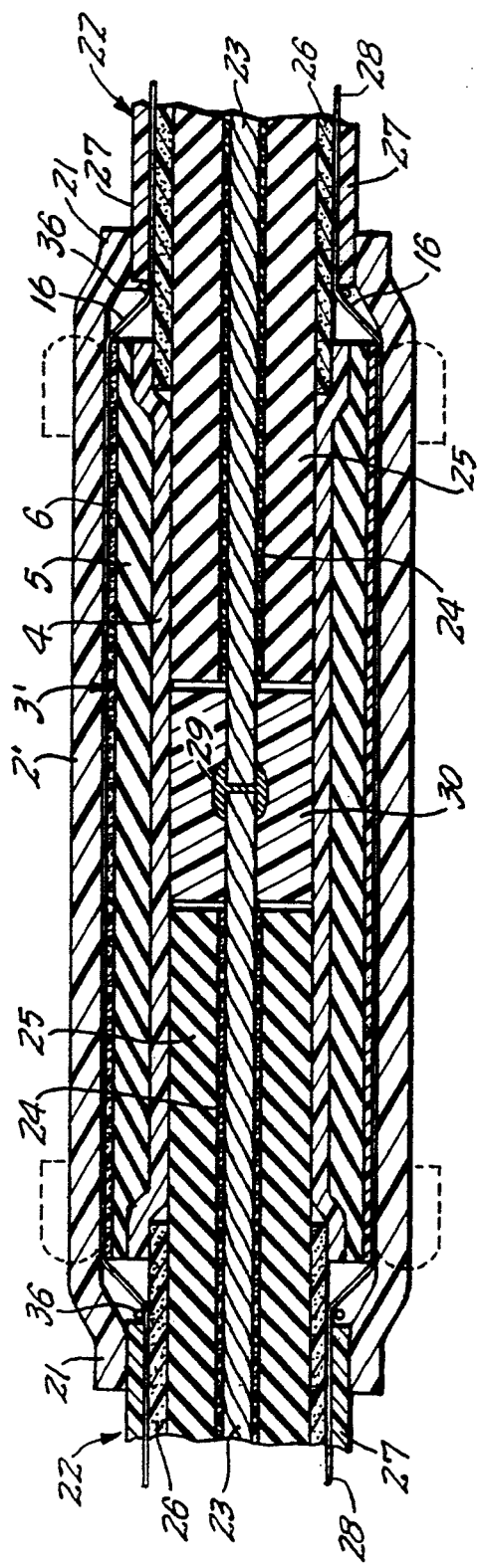
FIG. 10 is a longitudinal section of a cable joint according to the invention.

FIG. 10 shows a cable joint according to the invention and in particular a joint between cables realized with the covering of FIG. 7 and the element of FIG. 9.

As shown in FIG. 10, the joint interconnects two cables 22 each having the structure described hereinafter.

In the direction from the inside to the outside of each cable, there is a conductor 23, for example, formed by a plurality of stranded copper wires and having a cross-section of 150 mm$^2$.

Around the conductor 23, there is an inner semi-conductive layer 24, known per se, and having a thickness of 1.5 mm surrounded by a layer 25 having a thickness of 5.5 min. The layer 25 is formed of an insulating material compound of a type conventional for extruded insulation cables and consequently, need not be described in further detail.

On the layer 25, there is a conventional outer semi-conductive layer 26 having a thickness of 1.5 mm and around this latter there is a sheath 27 of polymeric material, for example, polyvinyl chloride, having a thickness of 2 mm.

A screen of metallic wires 28 is interposed between the outer semi-conductive layer 26 and the sheath 27 of the cables.

In the joint, the end of each cable 22 is prepared by baring a length of the conductor 23, a length of the insulation 25, a length of the outer semi-conductive layer 26 and a length of the metallic screen 28.

The conductors 23 of the two cables are arranged end-to-end and are connected to each other, for example, by a clamp or a soldering 29.

Around the zone of mechanical and electrical connection 29 of the two conductors 23, there is, according to the known technique, a filler 30 known per se, the outer surface of which is aligned with the outer surfaces of the insulation 25 of the cables.

Symmetrically arranged around the mechanical and electrical connection zone of the cable conductors 23, there is a joint covering, in particular, the Covering previously described in connection with FIG. 9.

As can be seen in FIG. 10, the ends 21 of the second sleeve 2' extend over the end portions of the sheaths 27 of the cables.

Moreover, the plurality of conductive elements 16 consisting of copper wires interposed between the first and the second sleeves and projecting beyond the ends of the second tubular body are fastened, such as by means of metal clamps 36 to the cable semi-conductive layer 26 and to the metallic screen 28 of this latter so as to realize in the joint the continuity of the metallic screen between the cables in the-joint zone.

When forming the joint shown in FIG. 10, which uses the element of FIG. 9, the fitting of the covering on the connection zone of the cable conductors takes place while both the ends 21 of the second sleeve are turned back on the radially outermost surface of the same as indicated with dashed lines in FIG. 10.

It follows that during the removal of the rigid tubular support from the covering, the elastic contraction force exerted by the second sleeve on the ends of the first sleeve is greater than that which would be exerted without the turning back of the ends 21.

This represents an advantage with respect to the other possible embodiments for the following reasons.

At the turn-back zone, the pressure that the second sleeve exerts on the ends of the first sleeve is greater, and this means a higher speed of elastic contraction of the covering at its ends, as compared to the situation in which said turning back is not present.

Such higher speed of elastic contraction of the covering at its ends ensures a greater reliability of maintaining it centered on the connection zone of the conductors during the removal of the tubular support 19.

In fact, during the removal of the tubular support 19 from the covering, the first part of covering, which goes into contact with the cables, is the end opposite to that from which the tubular support is removed, and a high speed of elastic contraction of said end, ensuring an immediate and prompt clamping of the covering on the cables, avoids any danger of minimum shiftings of said covering.

Although only a joint with the covering and element shown in FIG. 1 has been illustrated, it will be apparent to those skilled in the art that the coverings and elements described in connection with other Figures, for example, those described with reference to the FIGS. 4, 5, 6, 7 and 8 may be similarly employed to form joints between cables.

From the description of the disclosed embodiments and from the following considerations, it will be understood how the objects of the invention are reached by means of the present invention.

The characteristics of a covering according to the invention of being constituted by two elastically expansible and collapsible superimposed sleeves having the previously explained characteristics, of which the radially outermost one is fitted on the radially innermost one so as to encircle it radially, increases considerably the possibility of expansion of the covering with respect to the solution proposed in said patent application Ser. No. 464,370 without the arising of drawbacks.

In the solution according to the present invention, even if it is preferable that the outer sleeve has a residual deformation, due to an elongation imposed and applied for a period of time, smaller than that of the radially innermost sleeve, this is not strictly necessary, it being sufficient-that the outer sleeve has a residual deformation smaller than 35% for an imposed elongation of 50% determined by the standard UNI 7321-74 on a flat test piece at 100° C. for a period of time of 500 hours. This is because even if a certain permanent deformation can arise in the range of the radial expansion to which the second sleeve (the radially outermost one) of the covering is subject, the encircling action always exerted by the outermost sleeve on the innermost sleeve is able to compensate any permanent deformation occurring in this latter.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An electrical cable joint covering adapted to be stored in a radially stretched condition on a rigid tubular support comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, said second sleeve, separate from said first sleeve and without stress thereon, having a bore diameter smaller than the diameter of the exterior surface of said first sleeve separate from said second sleeve and without stress thereon and said second sleeve being elastically shrinkable without the application of heat, whereby with said first sleeve within said second sleeve, said second sleeve exerts radially inward pressure on said first sleeve.

2. An electrical cable joint covering as set forth in claim 1 wherein at least part of said second sleeve is formed by a polymeric compound having a residual deformation less than 35% when subjected to an elongation of 50% applied thereto for 500 hours at a temperature of 100° C.

3. An electrical cable joint covering as set forth in claim 1 wherein said first sleeve comprises a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound, and wherein said second sleeve comprises a radially outermost tubular layer and a further tubular layer radially inward of said outermost layer, the polymeric compound of said outermost layer having a residual deformation less than 35% with an imposed elongation of 50% applied for 500 hours at 100° C. and said further tubular layer of said second sleeve is semi-conductive.

4. An electrical cable joint covering as set forth in claim 1 wherein the polymeric compound of said second sleeve has a percentage ultimate elongation at least equal to 300% and the polymeric compound of said first sleeve has a percentage ultimate elongation at least equal to 150%.

5. An electrical cable joint covering as set forth in claim 1 wherein the modulus E of the polymeric compound of said second sleeve is at least equal to 0.2 MPa and the modulus E of the polymeric compound of said first sleeve is in the range from 0.2 MPa to 20 MPa.

6. An electrical cable joint covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and said first sleeve comprising a radially innermost tubular layer, a radially outermost tubular layer and a radially intermediate tubular layer, the polymeric compound of said innermost tubular layer having a dielectric constant $\epsilon$ at least equal to 6, the polymeric compound of said outermost tubular layer being semi-conductive and the polymeric compound of said intermediate layer being electrically insulating, the polymeric compound of said second sleeve having a residual deformation less than 35% when subjected to an elongation of 50% for 500 hours at 100° C. and said second sleeve, separate from said first sleeve and without stress thereon, having a bore diameter smaller than the diameter of the exterior surface of said first sleeve separate from said second sleeve and without stress thereon, whereby with said first sleeve within said second sleeve, said second sleeve exerts radially inward pressure on said first sleeve.

7. An electrical cable joint covering as set forth in claim 6 further comprising at least one electrically conductive metallic element intermediate said first sleeve and said second sleeve and extending beyond the axial ends of said first sleeve and said second sleeve.

8. An electrical cable joint covering as set forth in claim 7 wherein there are a plurality of metallic elements intermediate said first sleeve and said second sleeve, said elements being disposed in circumferentially spaced relation with respect to each other.

9. An electrical cable joint covering as set forth in claim 8 wherein said elements comprise copper wires, aluminum wires, plaited copper wires, plaited aluminum wires, braided copper wires or braided aluminum wires.

10. An electrical cable joint covering as set forth in claim 6 wherein said second sleeve has an axial length greater than the axial length of said first sleeve and has end portions extending beyond the axial ends of said first sleeve, 11. An electrical cable joint covering as set forth in claim 10 wherein each of said end portions has an axial length at least equal to 10% of the axial length of said first sleeve.

12. An electrical cable joint covering as set forth in claim 10 wherein each of said end portions is turned back on the radially outermost surface of said second sleeve.

13. An electrical cable joint covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, said second sleeve, separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve being at least 1.2, whereby with said first sleeve within said second sleeve, said second sleeve exerts radially inward pressure on said first sleeve.

14. An electrical cable joint covering as set forth in claim 4 wherein said first sleeve comprises a radially innermost tubular layer and a further tubular layer radially outward of said innermost layer, the polymeric compound of said innermost tubular layer having a dielectric constant ε at least equal to 6 and said further tubular later being an electrically insulating polymeric compound, and wherein said second sleeve comprises a radially outermost tubular layer, a radially innermost tubular layer and an intermediate tubular layer, the polymeric compound of said outermost layer having a residual deformation less than 35% with an imposed elongation of 50% applied for 500 hours at 100° C., the polymeric compound of the innermost layer of said second sleeve is electrically insulating and the polymeric compound of said intermediate layer is semi-conductive.

15. An element for applying a covering to electrical cable joint, said element comprising at least a first sleeve and a second sleeve mounted in elastically expanded condition on a rigid tubular support, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, said second sleeve, separate from said first sleeve and without stress thereon, having a bore diameter smaller than the diameter of the exterior surface of said first sleeve separate from said second sleeve and without stress thereon and said second sleeve being elastically shrinkable without the application of heat, whereby with said first sleeve within said second sleeve, said second sleeve exerts radially inward pressure on said first sleeve and when the tubular support is removed, causes the bore of said first sleeve to reduce to a predetermined diameter without the application of heat.

16. An element as set forth in claim 15 wherein at least part of said second sleeve is formed by a polymeric compound having a residual deformation less than 35% when subjected to an elongation of 50% applied thereto for 500 hours at a temperature of 100° C.

17. An element as set forth in claim 15 wherein said first sleeve comprises a radially innermost tubular layer and a further tubular layer radially outward of said innermost layer, the polymeric compound of said innermost tubular layer having a dielectric constant ε at least equal to 6 and said further tubular layer being an electrically insulating polymeric compound, and wherein said second sleeve comprises a radially outermost tubular layer and a further tubular layer radially inward of said outermost layer, the polymeric compound of said outermost layer having a residual deformation less than 35% with an imposed elongation of 50% applied for 500 hours at 100° C. and said further tubular layer of said second sleeve is semi-conductive.

18. An element as set forth in claim 15 wherein the polymeric compound of said second sleeve has a percentage ultimate elongation at least equal to 300% and the polymeric compound of said first sleeve has a percentage ultimate elongation at least equal to 150%.

19. An element as set forth in claim 15 wherein the modulus E of the polymeric compound of said second sleeve is at least equal to 0.2 MPa and the modulus E of the polymeric compound of said first sleeve is in the range from 0.2 MPa to 20 MPa.

20. An element for applying a covering to electrical cable joint covering comprising at least a first sleeve and a second sleeve mounted in elastically expanded condition on a rigid tubular support, each sleeve being formed of a cross-linked, polymeric compound and each sleeve being elastically expandable in the direction radially of the axis thereof and having an axially extending bore, said first sleeve being disposed within and co-axial with said second sleeve and said first sleeve comprising a radially innermost tubular layer, a radially outermost tubular layer and a radially intermediate tubular layer, the polymeric compound of said innermost tubular layer having a dielectric constant ε at least equal to 6, the polymeric compound of said outermost tubular layer being semi-conductive and the polymeric compound of said intermediate layer being electrically insulating, the polymeric compound of said second sleeve having a residual deformation less than 35% when subjected to an elongation of 50% for 500 hours at 100° C. and said second sleeve, separate from said first sleeve and without stress thereon, having a bore diameter smaller than the diameter of the exterior surface of said first sleeve separate from said second sleeve and without stress thereon, whereby with said first sleeve within said second sleeve, said second sleeve exerts radially inward pressure on said first sleeve.

21. An element as set forth in claim 20 further comprising at least one electrically conductive metallic element intermediate said first sleeve and said second sleeve and extending beyond the axial ends of said first sleeve and said second sleeve.

22. An element as set forth in claim 21 wherein there are a plurality of metallic elements intermediate said first sleeve and said second sleeve, said elements being disposed in circumferentially spaced relation with respect to each other.

23. An element as set forth in claim 22 wherein said elements comprise copper wires, aluminum wires, plaited copper wires, plaited aluminum wires, braided copper wires or braided aluminum wires.

24. An element as set forth in claim 20 wherein said second sleeve has an axial length greater than the axial length of said first sleeve and has end portions extending beyond the axial ends of said first sleeve.

25. An element as set forth in claim 24 wherein each of said end portions has an axial length at least equal to 10% of the axial length of said first sleeve.

26. An element as set forth in claim wherein 24 each of said end portions is turned back on the radially outermost surface of said second sleeve.

27. An element for applying a covering to electrical cable joint covering comprising at least a first sleeve and a second sleeve mounted in elastically expanded condition on a rigid tubular support, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, said second sleeve, separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve is at least 1.2, whereby with said first sleeve within said second sleeve, said second sleeve exerts radially inward pressure on said first sleeve.

28. An element as set forth in claim 27 wherein said first sleeve comprises a radially innermost tubular layer and a further tubular layer radially outward of said innermost layer, the polymeric compound of said innermost tubular layer having a dielectric constant at least equal to 6 and said further tubular layer being an electrically insulating polymeric compound, and wherein said second sleeve comprises a radially outermost tubular layer, a radially innermost tubular layer and an intermediate tubular layer, the polymeric compound of said outermost layer having a residual deformation less than 35% with an imposed elongation of 50% applied for 500 hours at 100° C., the polymeric compound of the innermost layer of said second sleeve is electrically insulating and the polymeric compound of said intermediate layer is semi-conductive.

29. An electrical cable joint between a pair of cables, said cables having conductors mechanically and electrically interconnected within said joint and having insulation around said conductors, said joint having a covering surrounding the connection between said conductors and said covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound and said first sleeve engaging and applying radially inward pressure on said insulation of said cables, said second sleeve, separate from said first sleeve and without stress thereon, having a bore diameter smaller than the diameter of the exterior surface of said first sleeve separate from said second sleeve and without stress thereon, whereby said second sleeve exerts radially inward pressure on said first sleeve and causes said first sleeve to exert a predetermined radially inward pressure on said insulation of said cables.

30. An electrical cable joint as set forth in claim 29 wherein at least part of said second sleeve is formed by a polymeric compound having a residual deformation less than 35% when subjected to an elongation of 50% applied thereto for 500 hours at a temperature of 100° C.

31. An electrical cable joint as set forth in claim 29 wherein said first sleeve comprises a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound, and wherein said second sleeve comprises a radially outermost tubular layer and a further tubular layer radially inward of said outermost layer, the polymeric compound of said outermost layer having a residual deformation less than 35% with an imposed elongation of 50% applied for 500 hours at 100° C. and said further tubular layer of said second sleeve is semi-conductive.

32. An electrical cable joint between a pair of cables, said cables having conductors mechanically and electrically interconnected within said joint and having insulation around said conductors, said joint having a covering surrounding the connection between said conductors and said covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and said first sleeve comprising a radially innermost tubular layer, a radially outermost tubular layer and a radially intermediate tubular layer, the polymeric compound of said innermost tubular layer having a dielectric constant $\epsilon$ at least equal to 6, the polymeric compound of said outermost tubular layer being semi-conductive and the polymeric compound of said intermediate layer being electrically insulating, the polymeric compound of said second sleeve having a residual deformation less than 35% when subjected to an elongation of 50% for 500 hours at 100° C. and said second sleeve, separate from said first sleeve and without stress thereon, having a bore diameter smaller than the diameter of the exterior surface of said first sleeve separate from said second sleeve and without stress thereon, whereby with said first sleeve within said second sleeve, said second sleeve exerts radially inward pressure on said first sleeve.

33. An electrical cable joint as set forth in claim 32 wherein said cables have metal screens around said insulation thereof and further comprising at least one electrically conductive metallic element intermediate said first sleeve and said second sleeve and extending beyond the axial ends of said first sleeve and said second sleeve, said element being conductively connected to said screens.

34. An electrical cable joint as set forth in claim 33 wherein there are a plurality of metallic elements intermediate said first sleeve and said second sleeve, said elements being disposed in circumferentially spaced relation with respect to each other.

35. An electrical cable joint as set forth in claim 34 wherein said elements comprise copper wires, aluminum wires, plaited copper wires, plaited aluminum wires, braided copper wires or braided aluminum wires.

36. An electrical cable joint as set forth in claim 32 wherein said second sleeve has an axial length greater than the axial length of said first sleeve and has end portions extending beyond the axial ends of said first sleeve.

37. An electrical cable joint as set forth in claim 36 wherein each of said end portions has an axial length at least equal to 10% of the axial length of said first sleeve.

38. An electrical cable joint as set forth in claim 36 wherein said cables have sheaths and wherein each of said end portions overlies said sheaths.

39. An electrical cable joint between a pair of cables, said cables having conductors mechanically and electrically interconnected within said joint and having insulation around said conductors, said joint having a covering surrounding the connection between said conductors and said covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, said second sleeve, separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve being at least 1.2.

40. An electrical cable joint as set forth in claim 39 wherein said first sleeve comprises a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound, and wherein said second sleeve comprises a radially outermost tubular layer, a radially innermost tubular layer and an intermediate tubular layer, the polymeric compound of said outermost layer having a residual deformation less than 35% with an imposed elongation of 50% applied for 500 hours at 100° C., the polymeric compound of the innermost layer of said second sleeve is electrically insulating and the polymeric compound of said intermediate layer is semi-conductive.

41. An electrical cable joint as set forth in claim 39 wherein the polymeric compound of said second sleeve has a percentage ultimate elongation at least equal to 300% and the polymeric compound of said first sleeve has a percentage ultimate elongation at least equal to 150%.

42. An electrical cable joint as set forth in claim 39 wherein the modulus E of the polymeric compound of said second sleeve is at least equal to 0.2 MPa and the modulus E of the polymeric compound of said first sleeve is in the range from 0.2 MPa to 20 MPa.

43. An electrical cable joint between a pair of cables, said cables having conductors mechanically and electrically interconnected within said joint and having insulation around said conductors, said joint having a covering surrounding the connection between said conductors and said covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and said first sleeve comprising a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound, said second sleeve comprising a radially outermost tubular layer, a radially innermost tubular layer and an intermediate tubular layer, the polymeric compound of said outermost layer having a residual deformation less than 35% with an imposed elongation of 50% applied for 500 hours at 100° C. the polymeric compound of the innermost layer of said second sleeve being electrically insulating and the polymeric compound of said intermediate layer being semi-conductive and said second sleeve, separate from said first sleeve and without stress thereon, having a bore diameter smaller than the diameter of the exterior surface of said first sleeve separate from said second sleeve and without stress thereon, whereby with said first sleeve within said second sleeve, said second sleeve exerts radially inward pressure on said first sleeve.

44. An electrical cable joint between a pair of cables, said cables having conductors mechanically and electrically interconnected within said joint and having insulation around said conductors, said joint having a covering surrounding the connection between said conductors and said covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, the polymeric compound of said second sleeve having a percentage ultimate elongation at least equal to 300% and the polymeric compound of said first sleeve having a percentage ultimate elongation at least equal to 150%, and said second sleeve, separate from said first sleeve and without stress thereon, having a bore diameter smaller than the diameter of the exterior surface of said first sleeve separate from said second sleeve and without stress thereon, whereby with said first sleeve within said second sleeve, said second sleeve exerts radially inward pressure on said first sleeve.

45. An electrical cable joint between a pair of cables, said cables having conductors mechanically and electrically interconnected within said joint and having insulation around said conductors, said joint having a covering surrounding the connection between said conductors and said covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, the modulus E of the polymeric compound of said second sleeve being at least equal to 0.2 MPa and the modulus E of the polymeric compound of said first sleeve being in the range from 0.2 MPa to 20 MPa and said second sleeve, separate from said first sleeve and without stress thereon, having a bore diameter smaller than the diameter of the exterior surface of said first sleeve separate from said second sleeve and without stress thereon, whereby with said first sleeve within said second sleeve, said second sleeve exerts radially inward pressure on said first sleeve.

46. An electrical cable joint covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and said first sleeve comprising a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound and said second sleeve comprising a radially outermost tubular layer and a further tubular layer radially inward of said outermost layer, the polymeric compound of said outermost layer having a residual deformation less than 35% with an imposed elongation of 50% applied for 500 hours at 100° C. and said further tubular layer of said second sleeve being semi-conductive, and said second sleeve, separate from said first sleeve and without stress thereon, having a bore diameter smaller than the diameter of the exterior surface of said first sleeve separate from said second sleeve and without stress thereon, the ratio of said diameter of said exterior surface of said sleeve to said bore diameter of said second sleeve being at least 1.2, whereby with said first sleeve within said second sleeve, said second sleeve exerts radially inward pressure on said first sleeve.

47. An electrical cable joint covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, the polymeric compound of said second sleeve having a percentage ultimate elongation at least equal to 300% and the polymeric compound of said first sleeve having a percentage ultimate elongation at least equal to 150% and said second sleeve, separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve being at least 1.2, whereby with said first sleeve within said second sleeve, said second sleeve exerts radially inward pressure on said first sleeve.

48. An electrical cable joint covering comprising at least a first sleeve and a second sleeve, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, the modulus E of the polymeric compound of said second sleeve being at least equal to 0.2 MPa and the modulus E of the polymeric compound of said first sleeve being in the range from 0.2 MPa to 20 MPa and said second sleeve, separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve is at least 1.2, whereby with said first sleeve within said second sleeve, said second sleeve exerts radially inward pressure on said first sleeve.

49. An element for applying a covering to electrical cable joint covering comprising at least a first sleeve and a second sleeve mounted in elastically expanded condition on a rigid tubular support, each sleeve being formed of a cross-linked, polymeric compound and each sleeve being elastically expandable in the direction radially of the axis thereof and having an axially extending bore, said first sleeve being disposed within and co-axial with said second sleeve and comprising a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound, said second sleeve comprising a radially outermost tubular layer and a further tubular layer radially inward of said outermost layer, the polymeric compound of said outermost layer having a residual deformation less than 35% with an imposed elongation of 50% applied for 500 hours at 100° C. and said further tubular layer of said second sleeve being semi-conductive and said second sleeve, separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve being at least 1.2, whereby with said first sleeve within said second sleeve, said second sleeve exerts radially inward pressure on said first sleeve.

50. An element for applying a covering to electrical cable joint covering comprising at least a first sleeve and a second sleeve mounted in elastically expanded condition on a rigid tubular support, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, the polymeric compound of said second sleeve having a percentage ultimate elongation at least equal to 300% and the polymeric compound of said first sleeve having a percentage ultimate elongation at least equal to 150% and said second sleeve, separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve being at least 1.2, whereby with said first sleeve within said second sleeve, said second sleeve exerts radially inward pressure on said first sleeve.

51. An element for applying a covering to electrical cable joint covering comprising at least a first sleeve and a second sleeve mounted in elastically expanded condition on a rigid tubular support, each sleeve being formed of a cross-linked, polymeric compound and each sleeve being elastically expandable in the direction radially of the axis thereof and having an axially extending bore, said first sleeve being disposed within and co-axial with said second sleeve and at least part of the radial thickness of said first sleeve being an electrically insulating, cross-linked, polymeric compound, the modulus E of the polymeric compound of said second sleeve being at least equal to 0.2 MPa and the modulus E of the polymeric compound of said first sleeve being in the range from 0.2 MPa to 20 MPa and said second sleeve separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve being at least 1.2, whereby with said first sleeve within said second sleeve, said second sleeve exerts radially inward pressure on said first sleeve.

52. An electrical cable joint between a pair of cables, said cables having conductors mechanically and electrically interconnected within said joint and having insulation around said conductors, said joint having a covering surrounding the connection between said conductors and said covering comprising at least a first sleeve and a second sleeve, each sleeve being formed of a cross-linked, polymeric compound and each sleeve being elastically expandible in the direction radially of the axis thereof and having an axially extending bore, said first sleeve being disposed within and co-axial with said second sleeve and said first sleeve comprising a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound, and said second sleeve comprising a radially outermost tubular layer and a further tubular layer radially inward of said outermost layer, the polymeric compound of said outermost layer having a residual deformation less than 35% with an imposed elongation of 50% applied for 500 hours at 100° C. and said further tubular layer of said second sleeve being semi-conductive, said second sleeve, separate from said first sleeve and without stress thereon, having a bore diameter smaller than the diameter of the exterior surface of said first sleeve separate from said second sleeve and without stress thereon, the ratio of said diameter of said exterior surface of said first sleeve to said bore diameter of said second sleeve being at least 1.2, whereby with said first sleeve within said second sleeve, said second sleeve exerts radially inward pressure on said first sleeve.

53. An element for applying a covering to electrical cable joint covering comprising at least a first sleeve and a second sleeve mounted in elastically expanded condition on a rigid tubular support, each sleeve being formed of a cross-linked, polymeric compound and each sleeve being elastically expandible in the direction radially of the axis thereof and having an axially extending bore, said first sleeve being disposed within and co-axial with said second sleeve and said first sleeve comprising a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound, and said second sleeve comprising a radially outermost tubular layer, a radially innermost tubular layer and an intermediate tubular layer, the polymeric compound of said outermost layer having a residual deformation less than 35% with an imposed elongation of 50% applied for 500 hours at 100° C., the polymeric compound of the innermost layer of said second sleeve being electrically insulating and the polymeric compound of said intermediate layer being semi-conductive, and said second sleeve, separate from said first sleeve and without stress thereon, having a bore diameter smaller than the diameter of the exterior surface of said first sleeve separate from said second sleeve and without stress thereon, whereby with said first sleeve within said second sleeve, said second sleeve exerts radially inward pressure on said first sleeve.

54. An electrical cable joint covering comprising at least a first sleeve and a second sleeve, each sleeve being formed of a cross-linked, polymeric compound and each sleeve being elastically expandible in the direction radially of the axis thereof and having an axially extending bore, said first sleeve being disposed within and co-axial with said second sleeve and said first sleeve comprising a radially innermost tubular layer and a further tubular layer radially outward of said innermost layer, the polymeric compound of said innermost tubular layer having a dielectric constant $\epsilon$ at least equal to 6 and said further tubular layer being an electrically insulating polymeric compound, and said second sleeve comprising a radially outermost tubular layer, a radially innermost tubular layer and an intermediate tubular layer, the polymeric compound of said outermost layer having a residual deformation less than 35% with an imposed elongation of 50% applied for 500 hours at 100° C., the polymeric compound of the innermost layer of said second sleeve being electrically insulating and the polymeric compound of said intermediate layer being semi-conductive, and said second sleeve, separate from said first sleeve and without stress thereon, having a bore diameter smaller than the diameter of the exterior surface of said first sleeve separate from said second sleeve and without stress thereon, whereby with said first sleeve within said second sleeve, said second sleeve exerts radially inward pressure on said first sleeve.

* * * * *

UNITED STATES PATENT AND TRADEMARK OFFICE
CERTIFICATE OF CORRECTION

PATENT NO. : 5,365,020
DATED : November 15, 1994
INVENTOR(S) : Vallauri et al

It is certified that error appears in the above-indentified patent and that said Letters Patent is hereby corrected as shown below:

Col. 11, line 30, "generatarices" should read --generatrices--;

Col. 11, line 66, "28" should read --16--;

Col. 12, line 4, "28" should read --16--;

Col. 12, line 15, "Covering" should read --covering;

Col. 12, line 25, "28" should read --16--;

Col. 14, line 60, after "sleeve" the comma (,) should be a period (.);

Col. 15, line 20, change "4" to --13--; and

Col. 16, line 66, "wherein 24" should read --24 wherein--.

Signed and Sealed this

Twenty-eight Day of March, 1995

Attest:

BRUCE LEHMAN

*Attesting Officer*     *Commissioner of Patents and Trademarks*